United States Patent
Kawamura et al.

(10) Patent No.: US 7,835,843 B2
(45) Date of Patent: Nov. 16, 2010

(54) ABNORMALITY DETERMINING APPARATUS AND METHOD FOR AUTOMATIC TRANSMISSION

(75) Inventors: Tatsuya Kawamura, Toyota (JP); Toshio Sugimura, Nagoya (JP); Hideo Masaki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 919 days.

(21) Appl. No.: 11/637,670

(22) Filed: Dec. 13, 2006

(65) Prior Publication Data

US 2007/0135986 A1    Jun. 14, 2007

(30) Foreign Application Priority Data

Dec. 14, 2005  (JP)  ............... 2005-360649

(51) Int. Cl.
G06F 7/00 (2006.01)
(52) U.S. Cl. .............. 701/62; 701/39; 701/43; 701/76; 701/92; 475/186; 475/208; 475/215; 475/216; 307/9.1; 477/50; 477/158; 477/159
(58) Field of Classification Search ............. 477/34, 477/50, 158, 159; 475/215, 216, 186, 208; 701/39, 43, 62, 76, 92, 97, 107
See application file for complete search history.

(56) References Cited

U.S. PATENT DOCUMENTS 5,590,040 A * 12/1996 Abe et al. ............. 701/35
5,855,532 A * 1/1999 Sugiyama ............. 477/97
6,436,001 B1 * 8/2002 Sakai et al. ............. 475/216

FOREIGN PATENT DOCUMENTS

| DE | 19525867 A1 | 1/1997 |
| DE | 69404419 T2 | 2/1998 |
| DE | 10318518 B4 | 1/2004 |
| JP | 11-280898 A | 10/1999 |

* cited by examiner

Primary Examiner—Tuan C To
Assistant Examiner—Redhwan Mawari
(74) Attorney, Agent, or Firm—Sughrue Mion, PLLC

(57) ABSTRACT

An ECU executes a program that includes a step of determining whether an output shaft rotation speed NOUT is equal to or greater than a reference rotation speed at which determining regions with all of the gear speeds in a stepped automatic transmission do not overlap, a step of determining that there is an abnormality in the gear speed by dividing the turbine rotation speed NT by the output shaft rotation speed NOUT if the output shaft rotation speed NOUT is not equal to or greater than that reference rotation speed, and a step of determining that there is an abnormality in the gear speed by subtracting a value, which is obtained by multiplying the output shaft rotation speed NOUT by the gear ratio, from the turbine rotation speed NT if the output shaft rotation speed NOUT is equal to or greater than that reference rotation speed.

9 Claims, 11 Drawing Sheets

|      | C1 | C2 | B1 | B2 | B3 | F |
|------|----|----|----|----|----|----|
| 1ST  | ○  | ×  | ×  | ◎  | ×  | △ |
| 2ND  | ○  | ×  | ○  | ×  | ×  | × |
| 3RD  | ○  | ×  | ×  | ×  | ○  | × |
| 4TH  | ○  | ○  | ×  | ×  | ×  | × |
| 5TH  | ×  | ○  | ×  | ×  | ○  | × |
| 6TH  | ×  | ○  | ○  | ×  | ×  | × |
| R    | ×  | ×  | ×  | ○  | ○  | × |
| N    | ×  | ×  | ×  | ×  | ×  | × |

ABNORMALITY DETERMINING APPARATUS AND METHOD FOR AUTOMATIC TRANSMISSION

INCORPORATION BY REFERENCE

The disclosure of Japanese Patent Application No. 2005-360649 filed on Dec. 14, 2005, including the specification, drawings and abstract is incorporated herein by reference in its entirety.

BACKGROUND OF THE INVENTION

1. Field of the Invention

The invention relates to an apparatus and method that determines whether an abnormality has occurred in an automatic transmission mounted in a vehicle. More particularly, the invention relates to an apparatus and method that accurately determines whether a gear ratio corresponding to a specified gear speed is not established.

2. Description of the Related Art

An automatic transmission mounted in a vehicle is a combination of a torque converter and a gear type shift mechanism. This automatic transmission is structured so as to automatically establish a gear speed according to an operating state of an engine by selectively switching between applying and releasing a plurality of friction apply elements such as clutches and brakes and thus changing the power transmission path in the gear type shift mechanism. This automatic transmission is provided with a hydraulic pressure control circuit which controls the supply of hydraulic fluid to the friction apply elements so as to apply or release those friction apply elements.

This automatic transmission is structured such that the gear speed, i.e., shifting, is controlled by controlling the hydraulic pressure supplied to the friction apply elements with the hydraulic pressure control circuit. This hydraulic pressure control circuit is provided with various solenoid valves which perform various functions such as generating hydraulic pressure, supplying and releasing the hydraulic pressure, and regulating the hydraulic pressure. The operation of these solenoid valves is controlled by electric control signals to control the hydraulic pressure supplied to the friction apply elements and the like.

In an automatic transmission having this kind of structure, there is a possibility that a solenoid valve may fail. For example, there may be an electrical failure, e.g., a disconnection or short circuit, in the solenoid valve, or there may be a mechanical failure, e.g., the plunger may stick or a seal may fail due to foreign matter wearing away at the seal. These kinds of failures may very well result in the solenoid valve failing to work properly. Thus, if such a failure occurs, a specified gear speed may not be able to be established due to the desired friction apply element not applying or releasing as it should in response to a shift command output according to the operating state of the engine.

Japanese Patent Application Publication No. JP-A-11-280898 describes a control apparatus of an automatic transmission which, in the event of a failure, appropriately and logically performs a failsafe control that prohibits the gear speed in which the failure was detected from being established and changes the transmission to another gear speed. This control apparatus of an automatic transmission includes a torque converter, a gear type shift mechanism that inputs power from an internal combustion engine via the torque converter, a plurality of friction apply elements that switch the power transmission path in the gear type shift mechanism, and a hydraulic pressure control circuit that switches gear speeds of the gear type shift mechanism by controlling the supply and release of hydraulic pressure to and from the friction apply elements. The control apparatus of the automatic transmission described above also includes actual gear ratio computing means for computing an actual gear ratio based on an input rotation speed and an output rotation speed of the gear type shift mechanism, shift command outputting means for outputting a shift command according to the operating state of the internal combustion engine, gear failure detecting means for detecting a gear failure in which a gear ratio of the gear type shift mechanism does not establish as directed by the shift command, by comparing the actual gear ratio with a gear ratio of a target gear speed specified by a shift command output by the shift command outputting means, and vehicle speed detecting means for detecting a vehicle speed. The gear type shift mechanism is structured to fall into a neutral state if a gear failure occurs in a predetermined high gear speed. Also, when a gear failure is detected in a predetermined high gear speed by the gear failure detecting means and the vehicle speed at which the gear failure was detected by the vehicle speed detecting means is less than a predetermined vehicle speed, the shift command outputting means described above changes the shift command to one for a predetermined gear speed that is lower than the high gear speed and which has a gear ratio that is closest to the gear ratio of the predetermined high gear speed. On the other hand, when a gear failure is detected in a predetermined high gear speed by the gear failure detecting means and the vehicle speed at which the gear failure was detected by the vehicle speed detecting means is greater than the predetermined vehicle speed, the shift command outputting means maintains the current shift command. When the vehicle speeds drops lower than the predetermined vehicle speed, shift command outputting means then changes that shift command to one for a predetermined low gear speed.

This control apparatus of an automatic transmission can shift the automatic transmission into a gear speed that can be established when it is determined that a failure has occurred in which the automatic transmission falls into a neutral state despite a shift command being output. As a result, a situation in which the automatic transmission is kept in the neutral state can be avoided so that driving force can be transmitted to the driven wheels by shifting the automatic transmission into a gear speed that can be established.

In the technology described in Japanese Patent Application Publication No. JP-A-11-280898, the actual gear ratio is calculated from the input shaft rotation speed and the output shaft rotation speed of the automatic transmission. An abnormality in which there is a gear failure where a gear ratio according to a shift command is unable to be established (i.e., a neutral failure or a case in which a gear speed is established that is different from the specified gear speed) can be detected when the actual gear ratio is outside of the gear ratio range of the specified gear speed (this range is set beforehand based on the detection accuracy of a rotation speed sensor and the like). When the output shaft rotation speed is in the high rotation speed region, the region in which this type of abnormality is unable to be detected tends to become larger, which leads to reduced accuracy of abnormality detection. Japanese Patent Application Publication No. JP-A-11-280898, however, makes no mention of this kind of problem.

SUMMARY OF THE INVENTION

In view of the foregoing problems, this invention thus provides an abnormality determining apparatus and method which can determine with high detection accuracy whether an abnormality has occurred in an automatic transmission.

A first aspect of the invention relates to an abnormality determining apparatus of an automatic transmission which establishes a specified gear speed from a plurality of gear speeds having different gear ratios. This abnormality determining apparatus includes a first abnormality determining device which calculates an actual gear ratio based on an input shaft rotation speed of the automatic transmission and an output shaft rotation speed of the automatic transmission, and determines that there is an abnormality in the gear ratio when the actual gear ratio is outside of a gear ratio range that is preset based on the specified gear speed; a second abnormality determining device which calculates an input shaft synchronous rotation speed based on the output shaft rotation speed and the gear ratio of the specified gear speed, and determines that there is an abnormality in the gear ratio when the difference between the input shaft rotation speed and the input shaft synchronous rotation speed is outside of a preset rotation speed range; a determining device that determines whether the output shaft rotation speed is in a high rotation speed region or a low rotation speed region with respect to a reference rotation speed that is set such that, between adjacent gear speeds, an upper limit value of the input shaft rotation speed of the automatic transmission in the rotation speed range when the specified gear speed is a high gear speed does not exceed a lower limit value of the input shaft rotation speed of the automatic transmission in the rotation speed range when the specified gear speed is a low gear speed; and an abnormality determining device that determines whether there is an abnormality in the gear ratio by selecting an abnormality determination according to the first abnormality determining device when the output shaft rotation speed is in the low rotation speed region, and selecting an abnormality determination according to the second abnormality determining device when the output shaft rotation speed is in the high rotation speed region.

According to this abnormality determining apparatus of an automatic transmission, the first abnormality determining device determines whether there is an abnormality based on the actual gear ratio which is calculated based on the input shaft rotation speed and the output shaft rotation speed. With the first determining device, the determining region of each gear speed expands as the output shaft rotation speed increases. Therefore, the first abnormality determining device can be applied when the output shaft rotation speed is in the low rotation speed region with respect to the reference rotation speed. The second abnormality determining device determines whether there is an abnormality based on the difference between the input shaft rotation speed and the calculated synchronous rotation speed. In this case, the region in which an abnormality is not determined (i.e., the gear speed determining region) can be made smaller and the abnormality determining region other than the gear speed determining region can be made larger, which inhibits a decrease in abnormality determining accuracy. With the second determining device, when the output shaft rotation speed is in the low rotation speed region, the upper limit value of the input shaft rotation speed in the rotation speed range when the specified gear speed is a high gear speed exceeds the lower limit value of the input shaft rotation speed in the rotation speed range when the specified gear speed is a low gear speed between adjacent gear speeds so a gear failure in which the automatic transmission falls into a neutral state is unable to be determined. Therefore, the second abnormality determining device can be applied when the output shaft rotation speed is in the high rotation speed region with respect to the reference rotation speed. Thus, appropriately using either the first abnormality determining device or the second abnormality determining device depending on whether the output shaft rotation speed is in the low rotation speed region or the high rotation speed region with respect to the reference rotation speed increases the detection accuracy of a failure in those regions. As a result, an abnormality determining apparatus of an automatic transmission is able to be provided which determines with high detection accuracy whether an abnormality has occurred in the automatic transmission.

A second aspect of the invention relates to an abnormality determining method of an automatic transmission which establishes a specified gear speed from a plurality of gear speeds having different gear ratios. This abnormality determining method of an automatic transmission includes the steps of i) determining whether an output shaft rotation speed is in a high rotation speed region or a low rotation speed region with respect to a reference rotation speed that is set such that, between adjacent gear speeds, an upper limit value of an input shaft rotation speed of the automatic transmission in a rotation speed range when the specified gear speed is a high gear speed does not exceed a lower limit value of the input shaft rotation speed of the automatic transmission in the rotation speed range when the specified gear speed is a low gear speed, and ii) calculating an actual gear ratio based on the input shaft rotation speed of the automatic transmission and the output shaft rotation speed of the automatic transmission when the output shaft rotation speed is determined to be in the low rotation speed region, and determining that there is an abnormality in the gear ratio when the actual gear ratio is outside of a gear ratio range that is preset based on the specified gear speed, and calculating an input shaft synchronous rotation speed based on the output shaft rotation speed and the gear ratio of the specified gear speed when the output shaft rotation speed is determined to be in the high rotation speed region, and determining that there is an abnormality in the gear ratio when the difference between the input shaft rotation speed and the input shaft synchronous rotation speed is outside of a preset rotation speed range.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
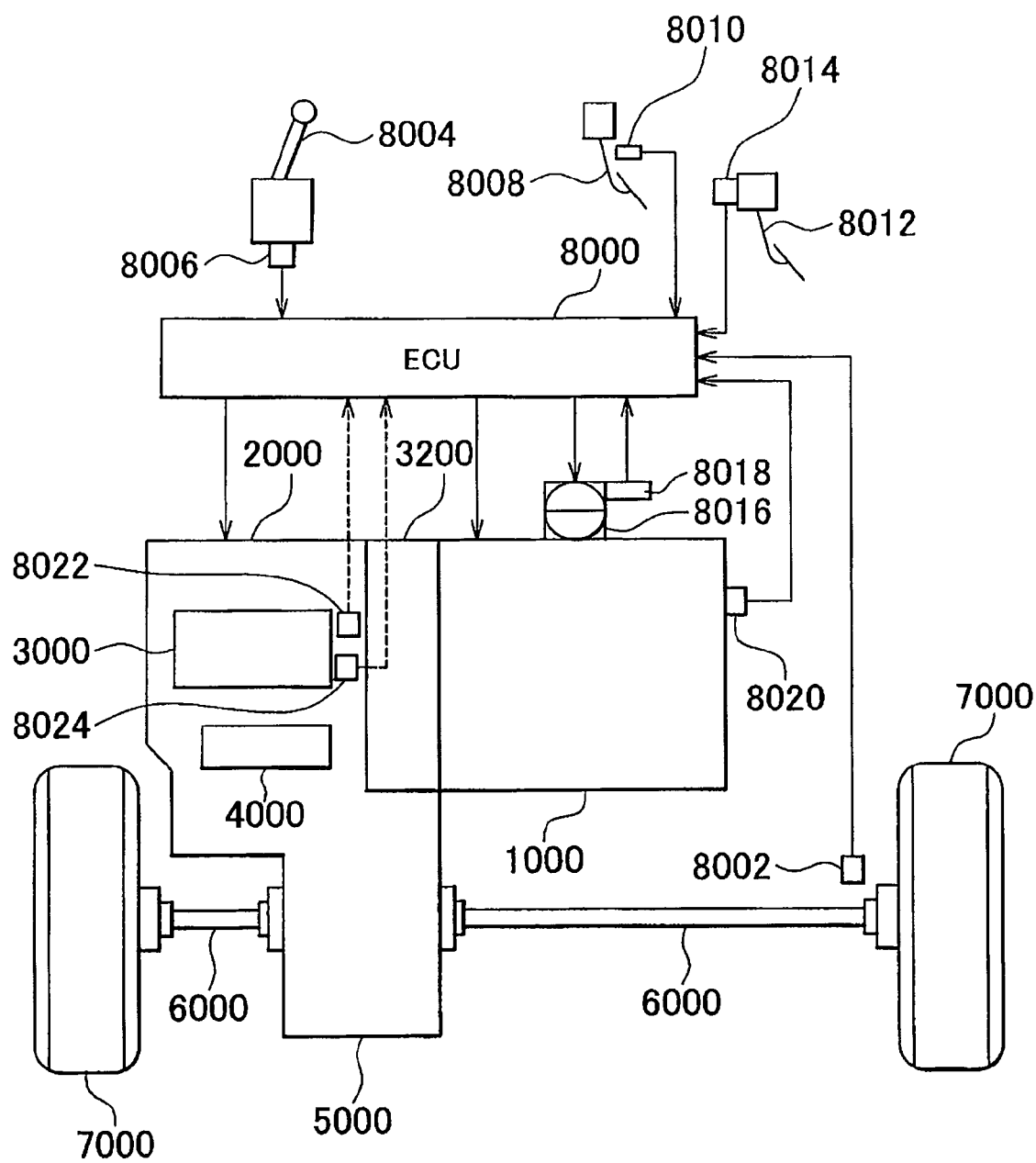
FIG. 1 is a block diagram schematically showing a power train according to a first example embodiment of the invention.

Hereinafter, example embodiments of the invention will be described in detail with reference to the accompanying drawings. In the following description, like parts with be denoted by like reference numerals. Like parts will also be referred to by same nomenclature and will have the same function. Therefore, detailed descriptions of those parts will not be repeated.

First Example Embodiment

A vehicle provided with an abnormality determining apparatus according to a first example embodiment of the invention will hereinafter be described with reference to FIG. 1. The vehicle described here is a FF (Front engine Front drive) vehicle, but it may also be a vehicle other than a FF vehicle.

The vehicle includes an engine 1000, an automatic transmission 2000, a planetary gear unit 3000 that constitutes part of the automatic transmission 2000, a hydraulic pressure circuit 4000 that also constitutes part of the automatic transmission 2000, a differential gear 5000, a drive shaft 6000, front wheels 7000, and an ECU (Electronic Control Unit) 8000.

The engine 1000 is an internal combustion engine which burns a mixture of air and fuel injected by an injector, not shown, in a combustion chamber of a cylinder. Force generated by the combustion of this air-fuel mixture forces the piston down in the cylinder which in turn rotates a crankshaft.

The automatic transmission 2000 is coupled to the engine 1000 via a torque converter 3200. The automatic transmission 2000 changes the rotation speed of the crankshaft to a desired rotation speed by establishing a desired gear speed.

An output gear of the automatic transmission 2000 is in mesh with the differential gear 5000 which is connected by spline engagement or the like to the drive shaft 6000. Power is transmitted via the drive shaft 6000 to the left and right front wheels 7000.

Various switches and sensors are connected via a harness or the like to the ECU 8000. These switches and sensors include a vehicle speed sensor 8002, a shift lever position switch 8006 of a shift lever 8004, an accelerator opening amount sensor 8010 of an accelerator pedal 8008, a stroke sensor 8014 of a brake pedal 8012, a throttle opening amount sensor 8018 of an electronic throttle valve 8016, an engine speed sensor 8020, an input shaft rotation speed sensor 8022, and an output shaft rotation speed sensor 8024.

The vehicle speed sensor 8002 detects the vehicle speed from the rotation speed of the drive shaft 6000 and outputs a signal indicative thereof to the ECU 8000. The shift lever position switch 8006 detects the position of the shift lever 8004 and outputs a signal indicative thereof to the ECU 8000. A gear speed of the automatic transmission 2000 corresponding to the position of the shift lever 8004 is then automatically established. The automatic transmission 2000 may also be structured so that a manual shift mode whereby a driver can select an appropriate gear speed can be selected according to an operation by the driver.

The accelerator opening amount sensor 8010 detects the opening amount of the accelerator pedal 8008 and outputs a signal indicative thereof to the ECU 8000. The stroke sensor 8014 detects a stroke amount of the brake pedal 8012 and outputs a signal indicative thereof to the ECU 8000.

The throttle opening amount sensor 8018 detects an opening amount of the electronic throttle valve 8016 which is adjusted by an actuator and outputs a signal indicative thereof to the ECU 8000. This electronic throttle valve 8016 adjusts the amount of air drawn into the engine 1000 (i.e., adjusts the output of the engine 1000).

The engine speed sensor 8020 detects a rotation speed of an output shaft (i.e., the crankshaft) of the engine 1000 and outputs a signal indicative thereof to the ECU 8000. The input shaft rotation speed sensor 8022 detects an input shaft rotation speed NI of the automatic transmission 2000 and outputs a signal indicative thereof to the ECU 8000. The output shaft rotation speed sensor 8024 detects an output shaft rotation speed NOUT of the automatic transmission 2000 and outputs a signal indicative thereof to the ECU 8000. The input shaft rotation speed NI of the automatic transmission 2000 is equal to a turbine rotation speed NT of the torque converter 3200, which will be described later.

The ECU 8000 controls various devices so that the vehicle runs in a desired manner based on the signals output from the vehicle speed sensor 8002, the shift lever position switch 8006, the accelerator opening amount sensor 8010, the stroke sensor 8014, the throttle opening amount sensor 8018, the engine speed sensor 8020, the input shaft rotation speed sensor 8022, and the output shaft rotation speed sensor 8024 and the like, as well as programs and maps stored in ROM (Read Only Memory).

In this example embodiment, when the shift lever 8004 is in a D (DRIVE) position, the ECU 8000 controls the automatic transmission 2000 so that a gear speed, from among first through sixth gear speeds, is automatically established according to a shift map that is set separately. Establishing one of the first to sixth gear speeds enables the automatic transmission 2000 to transmit driving force to the front wheels 7000.

In this case, if the automatic transmission 2000 becomes in a neutral state or the gear speed specified by the shift command is not established due to an abnormality in a solenoid valve or the like, the ECU 8000 quickly determines that the failure has occurred.

The planetary gear unit 3000 will now be described with reference to FIG. 2. This planetary gear unit 3000 is connected to the torque converter 3200 which has an input shaft 3100 that is connected to the crankshaft. The planetary gear unit 3000 includes a first planetary gear set 3300; a second planetary gear set 3400; an output gear 3500, a B1 brake 3610, a B2 brake 3620, and a B3 brake 3630, all of which are fixed to a gear case 3600; a C1 clutch 3640 and a C2 clutch 3650; and a one-way clutch (F) 3660.

The first planetary gear set 3300 is a single pinion type planetary gear set which includes a sun gear S (UD) 3310, a pinion gear 3320, a ring gear R (UD) 3330, and a carrier C (UD) 3340.

The sun gear S (UD) 3310 is coupled to the output shaft 3210 of the torque converter 3200. The pinion gear 3320 is rotatably supported on the carrier C (UD) 3340 and in mesh with the sun gear S (UD) 3310 and the ring gear R (UD) 3330.

The ring gear R (UD) 3330 is selectively held to the gear case 3600 by the B3 brake 3630. The carrier C (UD) 3340 is selectively held to the gear case 3600 by the B1 brake 3610.

The second planetary gear set 3400 is a Ravigneaux type planetary gear set which includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

The sun gear S (D) 3410 is coupled to the carrier C (UD) 3340. The short pinion gear 3420 is rotatably supported on the carrier C (1) 3422 and in mesh with the sun gear S (D) 3410 and the long pinion gear 3430. The carrier C (1) 3422 is coupled to the output gear 3500.

The long pinion gear 3430 is rotatably supported on the carrier C (2) 3432 and in mesh with the sun gear S (S) 3440 and the ring gear R (1) (R (2)) 3450. The carrier C (2) 3432 is coupled to the output gear 3500.

The sun gear S (S) 3440 is selectively coupled to the output shaft 3210 of the torque converter 3200 by the C1 clutch 3640. The ring gear R (1) (R (2)) 3450 is selectively held to the gear case 3600 by the B2 brake 3620 and also selectively coupled to the output shaft 3210 of the torque converter 3200 by the C2 clutch 3650. The ring gear R (1) (R (2)) 3450 is also coupled to the one-way clutch (F) 3660 so that it is unable to rotate when the vehicle is driven in first gear speed.

The one-way clutch (F) 3660 is provided in parallel with the B2 brake 3620. That is, an outer race of the one-way clutch (F) 3660 is fixed to the gear case 3600 while an inner race is connected to the ring gear R (1) (R (2)) 3450 via a rotating shaft.

Figures 3, 4:
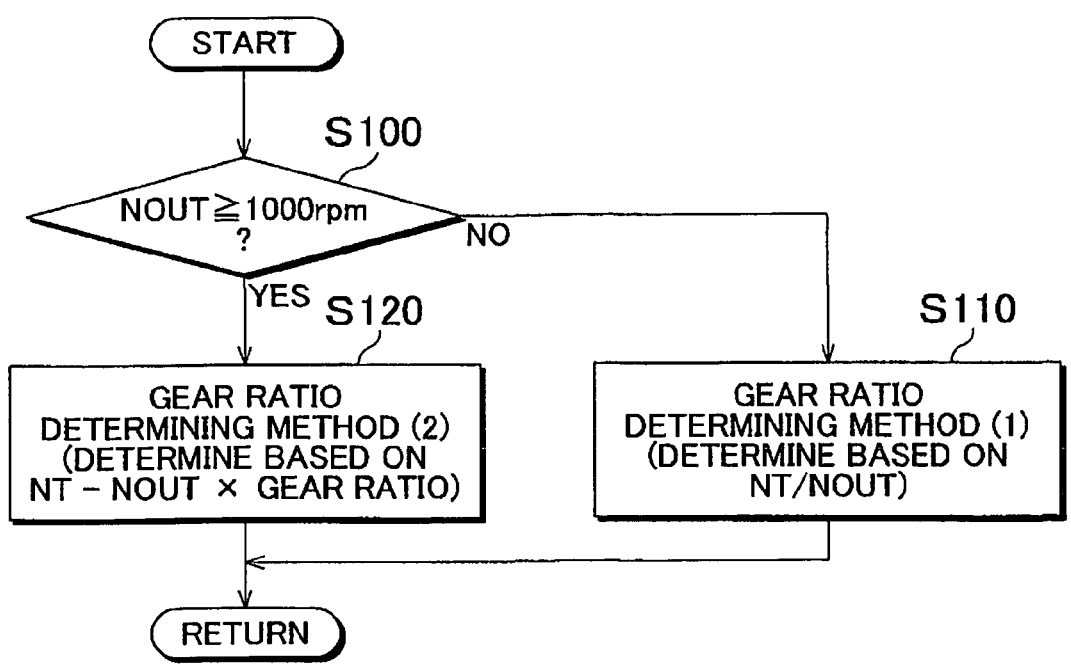
FIG. 3 is a clutch and brake application chart showing various application and release combinations of clutches and brakes to achieve specific speeds in the automatic transmission shown in FIG. 2.
FIG. 4 is a flowchart showing the control structure of a program executed by an ECU according to the first example embodiment.

FIG. 3 is a clutch and brake application chart showing the relationship between the various gear speeds and the operating states of the clutches and brakes. Six forward gear speeds, i.e., first gear speed through sixth gear speed, as well as reverse are established by operating the brakes and clutches in the combinations shown in this clutch and brake application chart.

Figure 2:
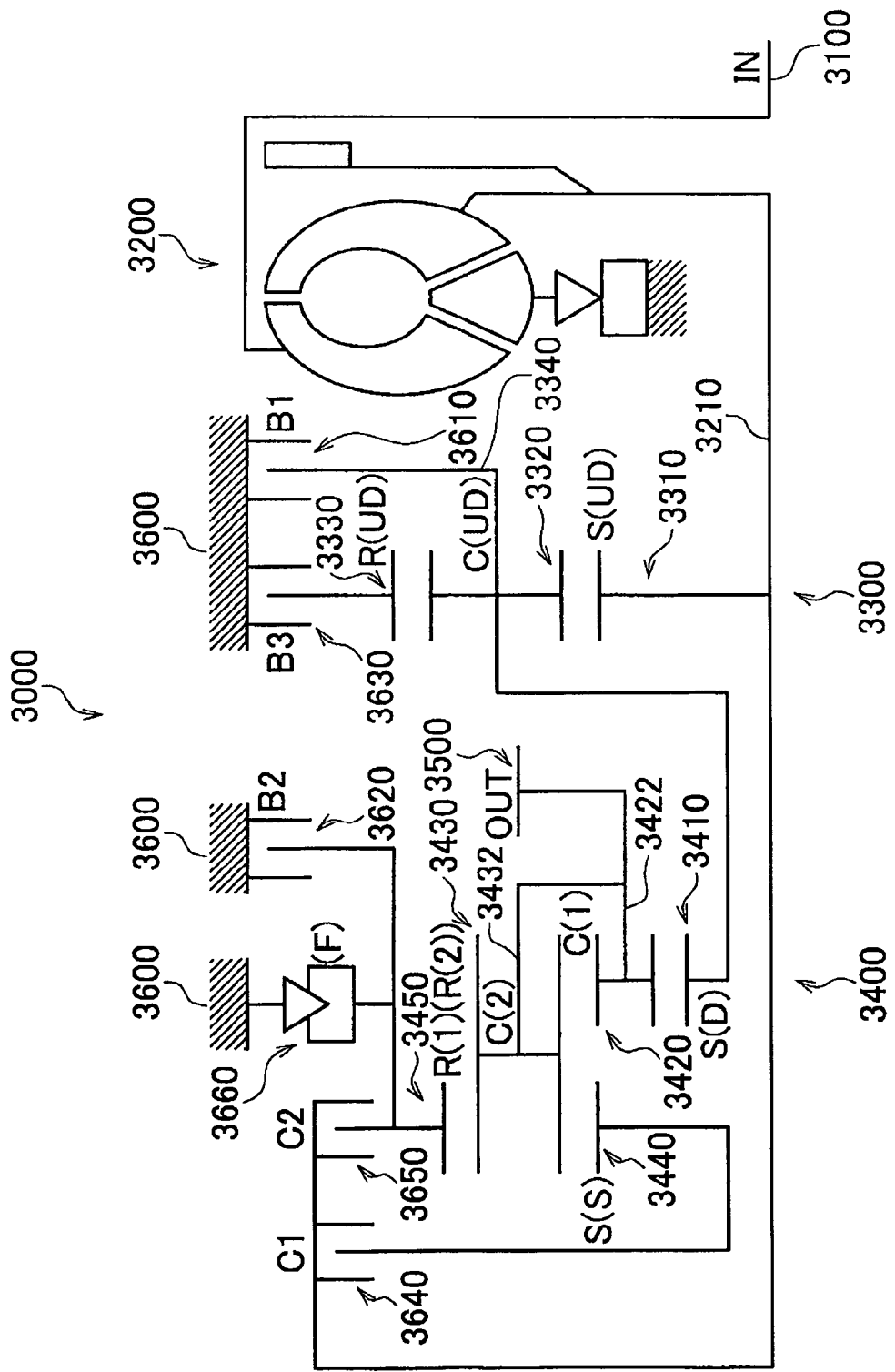
FIG. 2 is a skeleton view of a gear train in an automatic transmission.

One example of an abnormality (i.e., failure) that can occur in the automatic transmission 2000 shown in FIG. 2 is as follows. If the B3 brake 3630 is unable to be applied because hydraulic pressure is not applied to that B3 brake 3630 due to an abnormality of a solenoid valve, for example, when the transmission automatically shifts from fourth gear speed to fifth gear speed, fifth gear speed is unable to be established and the transmission falls into a neutral state.

The ECU 8000 which serves as the abnormality determining apparatus according to this example embodiment detects a failure in which a gear speed corresponding to a shift command output during this kind of shift control is unable to be established over a wide speed region.

The control structure of a program executed by the ECU 8000 according to this example embodiment will now be described with reference to FIG. 4.

In step S100, the ECU 8000 determines whether the output shaft rotation speed NOUT detected by the output shaft rotation speed sensor 8024 is equal to or greater than a reference rotation speed (such as 1000 rpm). The reference rotation speed of 1000 rpm is only an example and is a rotation speed at which the regions of adjacent gear speeds (such as the gear speed of N speed and the gear speed of (N+1) speed) do not overlap. This will be described in more detail later. If the output shaft rotation speed NOUT is equal to or greater than 1000 rpm (i.e., YES in step S100), the process proceeds on to step S120. If not (i.e., NO in step S100), the process proceeds on to step S110. This determination may also be made using the vehicle speed detected by the vehicle speed sensor 8002 instead of using the output shaft rotation speed.

In step S110, the ECU 8000 executes a speed determining process using a gear ratio determining method (1). This gear ratio determining method (1) is a method for determining the gear ratio by dividing the turbine rotation speed NT by the output shaft rotation speed NOUT (turbine rotation speed NT/output shaft rotation speed NOUT=gear ratio). The actual gear speed is determined to be N gear speed when the expression (N speed gear ratio lower limit≦turbine rotation speed NT/output shaft rotation speed NOUT<N speed gear ratio upper limit) is satisfied. That is, in the low rotation speed region the gear speed= is determined using the rotation speed ratio. That is, the actual gear speed is determined to be N speed when the expression (output shaft rotation speed NOUT×N speed gear ratio lower limit≦turbine rotation speed NT<output shaft rotation speed NOUT×N speed gear ratio upper limit) is satisfied. Therefore, when the output shaft rotation speed NOUT is in the high rotation speed region, the determining region of the actual gear speed becomes larger, and conversely, the failure determining region becomes smaller or the determining regions of adjacent gear speeds overlap.

In step S120, the ECU 8000 executes a speed determining process using another gear ratio determining method (2). This gear ratio determining method (2) is a method for determining the gear ratio by subtracting a value, which is obtained by multiplying the output shaft rotation speed NOUT by the gear ratio, from the turbine rotation speed NT (i.e., (turbine rotation speed NT−output shaft rotation speed NOUT×gear ratio). The actual gear speed is determined to be N gear speed when the expression (rotation speed difference lower limit≦turbine rotation speed NT−(output shaft rotation speed NOUT×N speed gear ratio)<rotation speed difference upper limit) is satisfied. That is, in the high rotation speed region, the gear speed is determined using the rotation speed difference, which prevents the region in which it is possible to determine a failure from becoming smaller as the output shaft rotation speed rises.

The operation of the gear speed determination which is controlled by the ECU 8000, i.e., the control apparatus according to this example embodiment, based on the flowchart and structure described above will now be described with reference to FIGS. 5 and 6. FIG. 6 shows a determining method of related art in which the gear speed is uniformly determined by the gear ratio without taking the output shaft rotation speed into account.

If it is determined that the output shaft rotation speed NOUT detected by the output shaft rotation speed sensor 8024 is less than 1000 rpm which is an example reference rotation speed (i.e., NO in step S100), the gear ratio determining method (1) is used.

If, on the other hand, it is determined that the output shaft rotation speed NOUT detected by the output shaft rotation speed sensor 8024 is equal to or greater than 1000 rpm (i.e., YES in step S100), the gear ratio determining method (2) is used.

[N Speed Determining Region, (N+1) Speed Determining Region, and Failure Determination Possible Region in the Low Rotation Speed Region]

Figure 5:
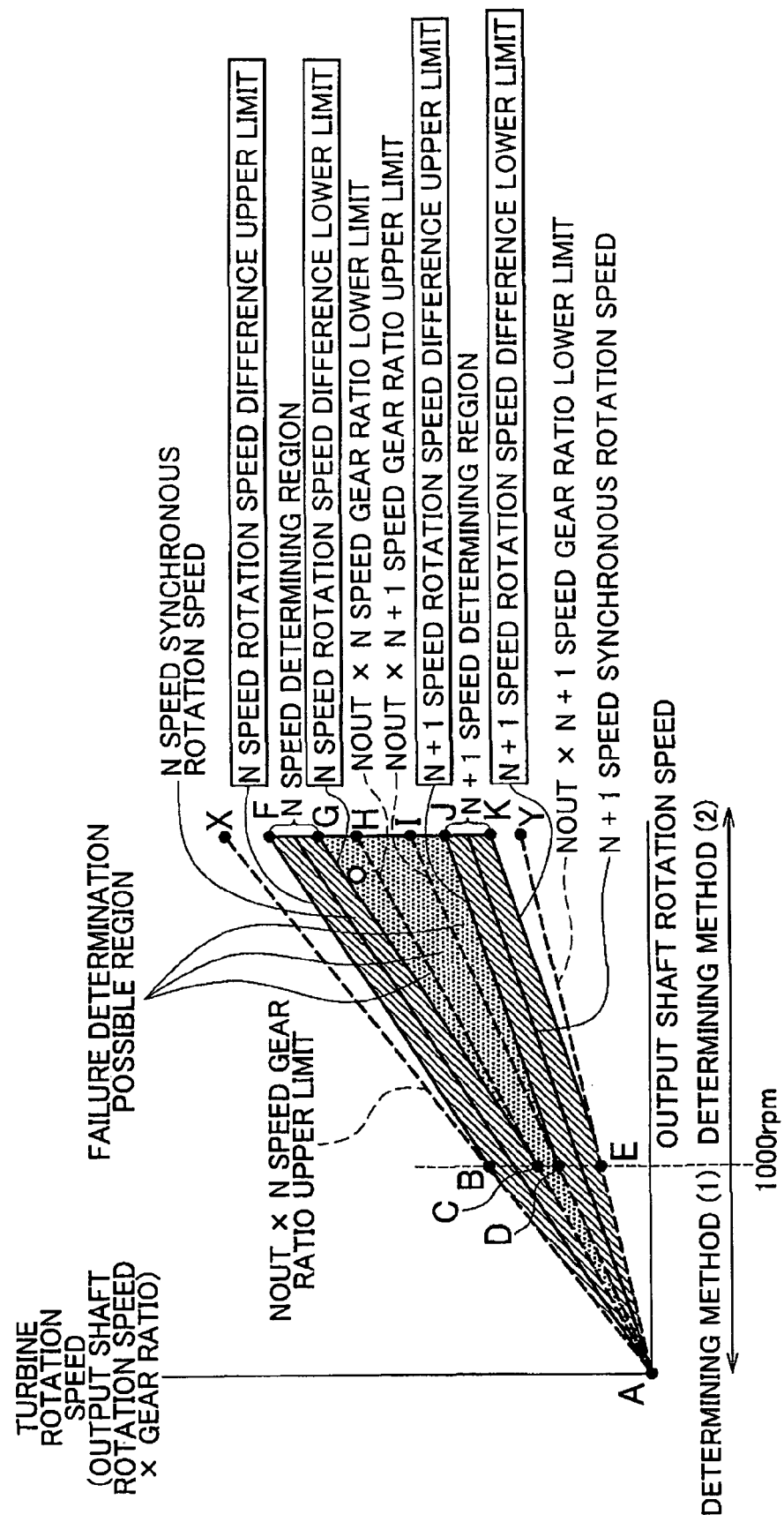
FIG. 5 is a graph showing gear ratio determining regions when the program shown in FIG. 4 is executed.
Figure 6:
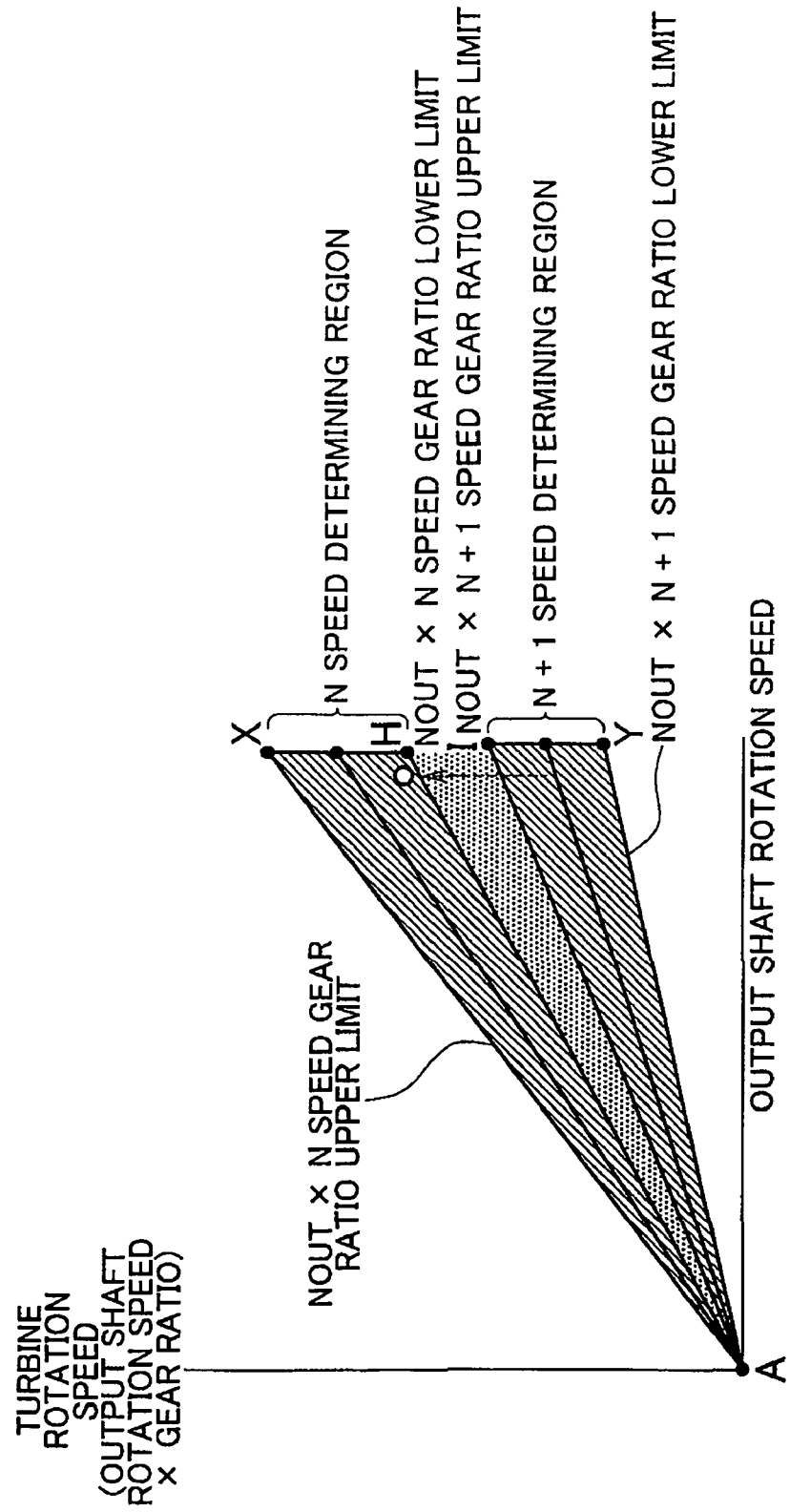
FIG. 6 is a graph showing gear ratio determining regions in related art.

As shown in FIG. 5, in the low rotation speed region (less than 1000 rpm), the N speed determining region is the portion corresponding to the triangular region ABC outlined by three straight lines which are the straight line AB of the NOUT×N speed gear ratio upper limit that extends from origin A, the straight line AC of the NOUT×N speed gear ratio lower limit extending from origin A, and the vertical line indicative of the output shaft rotation speed NOUT of 1000 rpm. The (N+1) speed determining region is the portion corresponding to the triangular region ADE outlined by three straight lines which are the straight line AD of the NOUT×(N +1) speed gear ratio upper limit extending from origin A, the straight line AE of the NOUT×(N+1) speed gear ratio lower limit extending from origin A, and the vertical line indicative of the output shaft rotation speed NOUT of 1000 rpm. The failure determining possible region (i.e., the region in which a failure can be determined) is the region between the N speed determining region and the (N+1) speed determining region, and is thus the portion corresponding to the triangular region ACD outlined by three straight lines which are the straight line AC of the NOUT×N speed gear ratio lower limit, the straight line AD of the NOUT×(N+1) speed gear ratio upper limit, and the vertical line indicative of the output shaft rotation speed of 1000 rpm (i.e., the dotted portion in determining method (1) in FIG. 5).

[N Speed Determining Region, (N+1) Speed Determining Region, and Failure Determination Possible Region in the High Rotation Speed Region]

As shown in FIG. 5, in the high rotation speed region (equal to or greater than 1000 rpm), the N speed determining region is the portion corresponding to the parallelogram region BFGC outlined by three straight lines which are the straight line BF of the N speed rotation speed difference upper limit (such as 50 rpm faster than the N speed synchronous rotation speed), the straight line CG of the N speed rotation speed difference lower limit (such as 50 rpm slower than the N speed synchronous rotation speed), and the vertical line indicative of the output shaft rotation speed NOUT of 1000 rpm. The (N+1) speed determining region is the portion corresponding to the parallelogram region DJKE outlined by three straight lines which are the straight line DJ of the (N+1) speed rotation speed difference upper limit (such as 50 rpm faster than the N speed synchronous rotation speed), the straight line EK of the (N+1) speed rotation speed difference lower limit (such as 50 rpm slower than the N speed synchronous rotation speed), and the vertical line indicative of the output shaft rotation speed NOUT of 1000 rpm. The failure determining possible region is the region between the N speed determining region and the (N+1) speed determining region, and is thus the portion corresponding to the rectangle region CGJD outlined by three straight lines which are the straight line CG of the N speed rotation speed difference lower limit, the straight line DJ of the (N+1) speed rotation speed difference upper limit, and the vertical line indicative of the output shaft rotation speed of 1000 rpm (i.e., the dotted portion in determining method (2) in FIG. 5).

With respect to this, when processing is done using determining method (1) throughout all of the rotation speed regions as is done in the related art, the failure detection possible region is the portion corresponding to the triangular region AHI which is between the portion corresponding to the triangular region AXH, i.e., the N speed detecting region, and the triangular region AIY, i.e., the (N+1) speed determining region. That is, the failure determination possible region is the portion corresponding to the triangular region AHI outlined by the straight line AH of the NOUT×N speed gear ratio lower limit and the straight line AI of the NOUT×(N+1) speed gear ratio upper limit (i.e., the dotted portion in FIG. 6).

The following problem occurs when a failure determination possible region such as that indicated by the dotted portion in FIG. 6 is applied to the entire region of the output shaft rotation speed NOUT without taking the output shaft rotation speed NOUT into account. That is, even if there is a failure in which the transmission shifts from being in a state in which a gear ratio of (N+1) speed is established to a neutral state (i.e., a neutral failure) and the turbine rotation speed increases abruptly (the white dot in FIG. 6), that increase is in the N speed determining region AXH so the neutral failure is not determined.

In contrast, in this example embodiment, the failure determination possible region in the high rotation speed region is expanded from the region AHI shown in FIG. 6 to the region AGJ shown in FIG. 5. As a result, the abrupt increase in turbine rotation speed NT caused by the neutral failure which was unable to be determined as a failure in FIG. 6 is able to be determined as a failure because it is not in the N speed determining region BFGC in FIG. 5.

As described above, with the abnormality determining apparatus according to this example embodiment, when the output shaft rotation speed is in a high rotation speed region equal to or greater than the reference rotation speed, an abnormality is determined based on the difference between the input shaft rotation speed (i.e., the turbine rotation speed NT) and the calculated synchronous rotation speed (NOUT×gear ratio). In this case, the region in which an abnormality is not able to be determined can be made smaller, thereby suppressing a decrease in abnormality determining accuracy. Also, when the output shaft rotation speed NOUT is in the low rotation speed region less than the reference rotation speed, an abnormality is determined based on the calculated actual gear ratio (NT/NOUT). If an abnormality is determined based on whether the difference between the input shaft rotation speed and the calculated synchronous rotation speed is outside of a predetermined rotation speed range, then when the output shaft rotation speed is low, the upper limit value of the input shaft rotation speed in the rotation speed range when the specified gear speed is a high gear speed exceeds the lower limit value of the input shaft rotation speed in the rotation speed range when the specified gear speed is a low gear speed between adjacent gear speeds, such that a gear failure in which the automatic transmission falls into neutral is unable to be determined. However, the abnormality at this time can be determined based on the calculated actual gear ratio.

Second Example Embodiment

Hereinafter, a second example embodiment of the invention in which a program that differs from the program executed by the abnormality determining apparatus according to the first example embodiment is executed will be described. The hardware configuration of the vehicle (FIGS. 1, 2, and 3) is the same as it is in the first example embodiment so a detailed description thereof will not be repeated.

In this second example embodiment, an abnormality of the gear speed of the automatic transmission 2000 is determined by setting the vehicle speed (i.e., output shaft rotation speed NOUT) to the reference rotation speed so that the rotation speed regions using gear ratio determining method (2) whereby the determination is made based on the rotation speed difference do not overlap at all of the gear speeds in the automatic transmission 2000.

Figure 7:
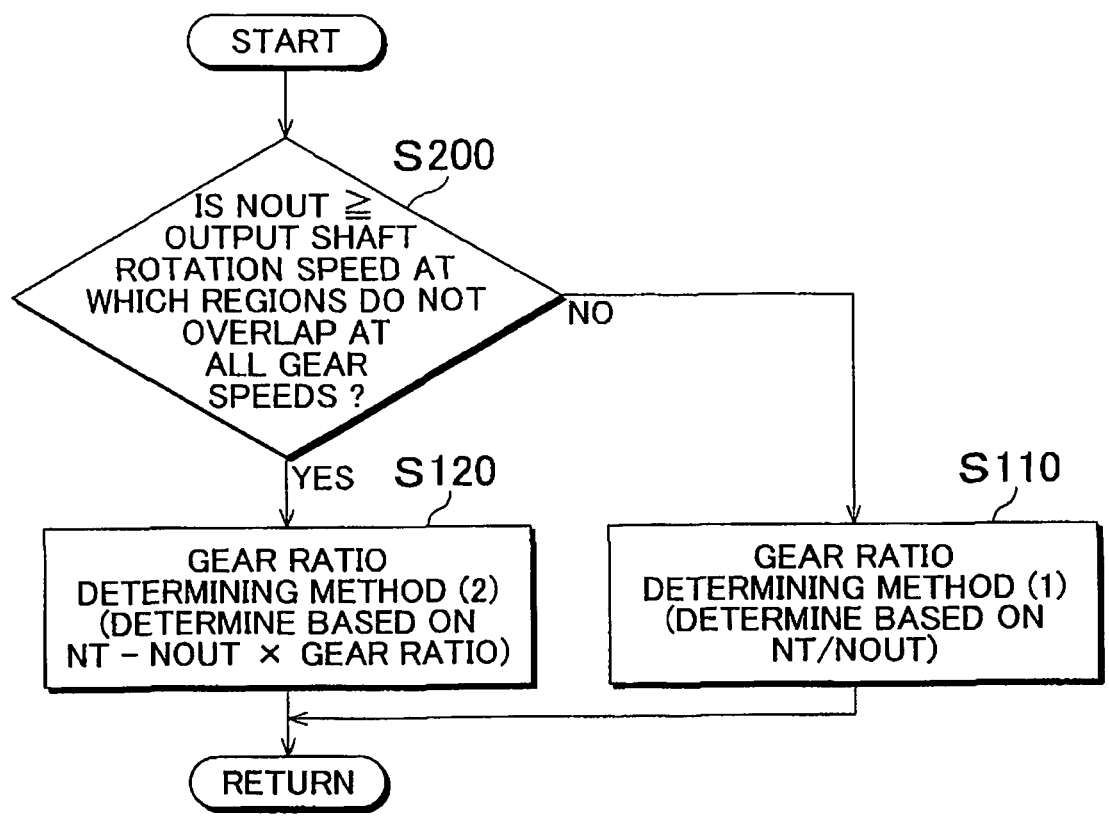
FIG. 7 is a flowchart showing the control structure of a program executed by an ECU according to a second example embodiment of the invention.

The control structure of the program executed by the ECU 8000 according to this example embodiment will be described with reference to FIG. 7. Steps in the flowchart in FIG. 7 that are the same as steps in the flowchart in FIG. 4 will be denoted by like step numbers. Further, the content (i.e., process) of like steps is the same so detailed descriptions thereof will not be repeated.

In step S200, the ECU 8000 determines whether the output shaft rotation speed NOUT detected by the output shaft rotation speed sensor 8024 is equal to or greater than a reference rotation speed. This reference rotation speed is set to be a rotation speed at which the determining regions of adjacent gear speeds (i.e., 6th gear speed and 5th gear speed, 5th gear speed and 4th gear speed, 4th and 3rd gear speed, 3rd gear speed and 2nd gear speed, 2nd gear speed and 1st gear speed) of all six gear speeds of the automatic transmission 2000 do not overlap. If the output shaft rotation speed NOUT is equal to or greater than this reference rotation speed (i.e., YES in step S200), the process proceeds on to step S120. If not (i.e., NO in step S200), the process proceeds on to step S110.

Figure 8:
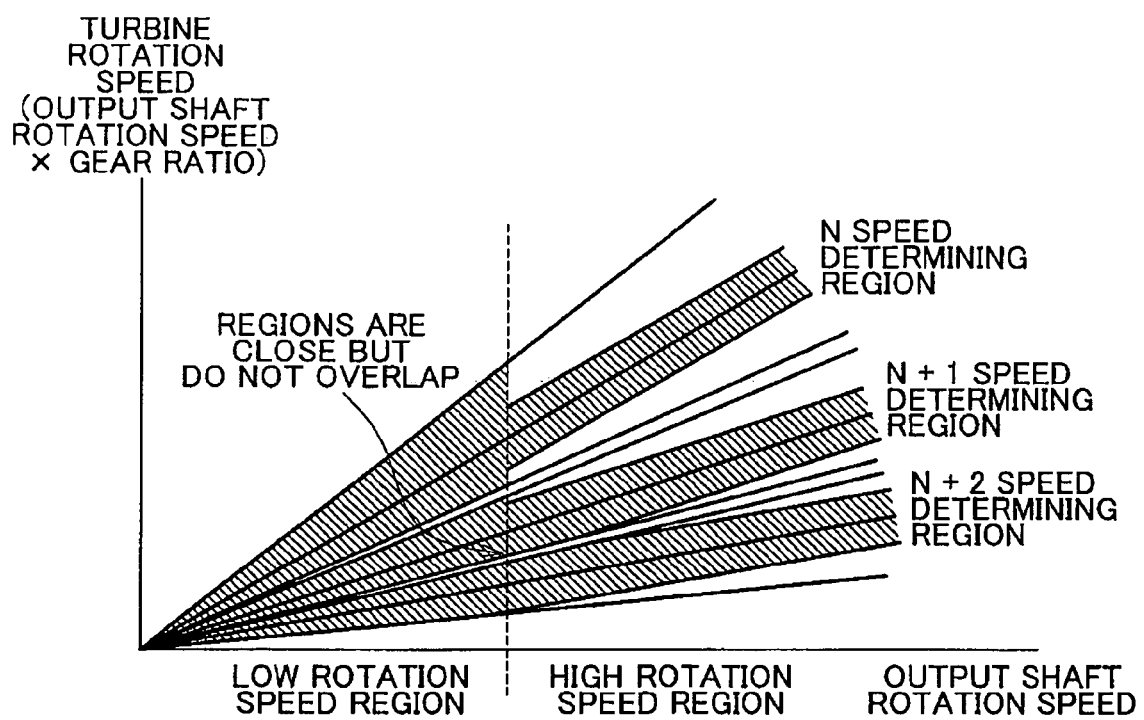
FIG. 8 is a graph showing gear ratio determining regions when the program shown in FIG. 7 is executed.

FIG. 8 shows the relationship between the output shaft rotation speed and the determining regions of the gear speeds in this example embodiment. In the drawing, only three speeds, i.e., N speed, (N+1) speed, and (N+2) speed, are shown. As shown in FIG. 8, the regions of adjacent gear speeds in the low rotation speed region do not overlap so it is possible to identify a neutral failure using gear ratio determining method (1). In the high rotation speed region as well, the failure determination possible region can be set wider without making the gear speed determining region larger, thereby making it possible to avoid an erroneous determination.

Third Example Embodiment

Hereinafter, a third example embodiment of the invention in which a program is executed that differs from the program executed by the abnormality determining apparatus according to the first example embodiment will be described. The hardware configuration of the vehicle (FIGS. 1, 2, and 3) is the same as it is in the first example embodiment so a detailed description thereof will not be repeated.

In this example embodiment, an abnormality of the gear speed of the automatic transmission 2000 is determined by setting a plurality of reference rotation speeds for vehicle speeds (i.e., output shaft rotation speeds NOUT) so that the rotation speed regions using gear ratio determining method (2) whereby the determination is made based on the rotation speed difference do not overlap at adjacent gear speeds in the automatic transmission 2000.

Figure 9:
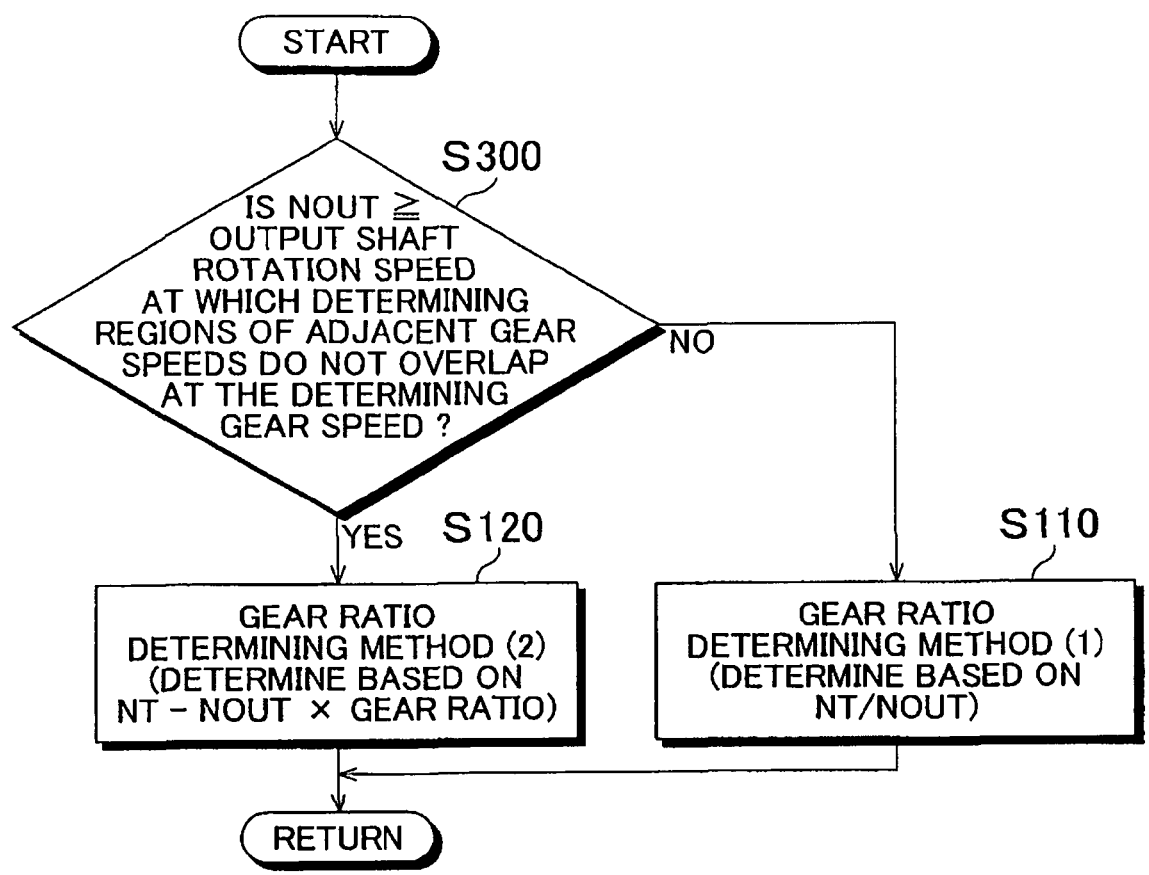
FIG. 9 is a flowchart showing the control structure of a program executed by an ECU according to a third example embodiment of the invention.

The control structure of the program executed by the ECU 8000 according to this example embodiment will be described with reference to FIG. 9. Steps in the flowchart in FIG. 9 that are the same as steps in the flowchart in FIG. 4 will be denoted by like step numbers. Further, the content (i.e., process) of like steps is the same so detailed descriptions thereof will not be repeated.

In step S300, the ECU 8000 determines whether the output shaft rotation speed NOUT detected by the output shaft rotation speed sensor 8024 is equal to or greater than the reference rotation speed at which the determining region of the gear speed to be determined in this step does not overlap with the determining region of adjacent gear speeds. This reference rotation speed is set for each gear speed as a rotation speed at which the gear speed to be determined in the automatic transmission 2000 does not overlap with the determining region of an adjacent gear speed. If the output shaft rotation speed NOUT is equal to or greater than this reference rotation speed (i.e., YES in step S300), the process proceeds on to step S120. If not (i.e., NO in step S300), the process proceeds on to step S110.

Figure 10:
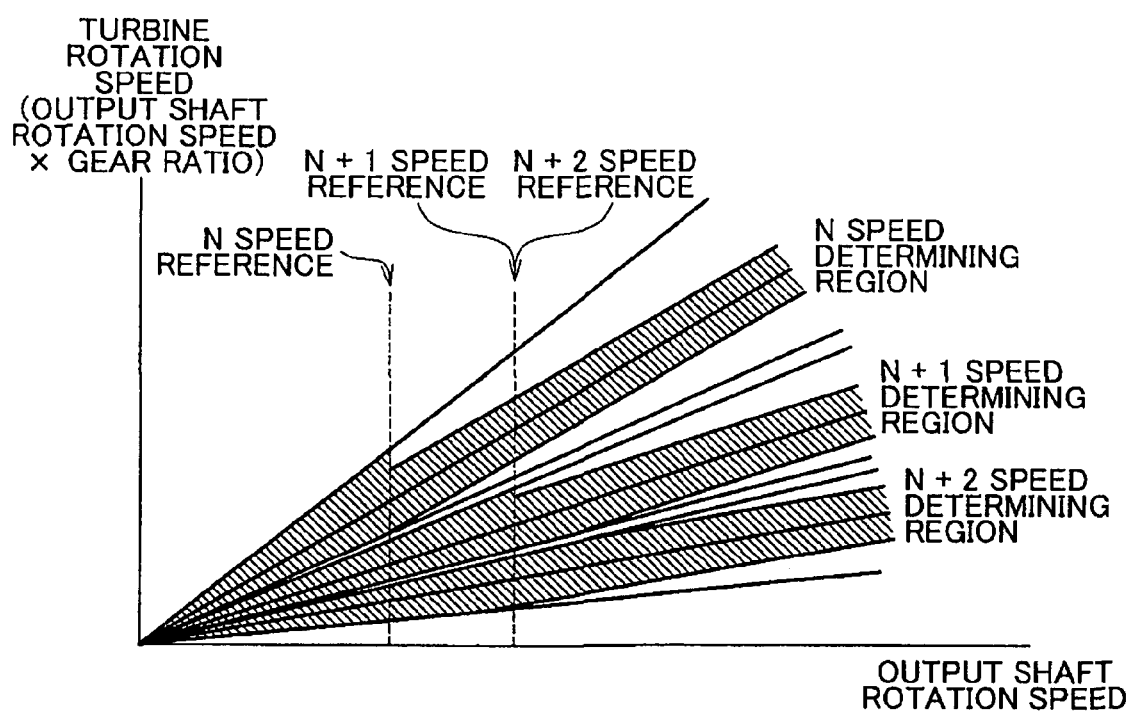
FIG. 10 is a graph showing gear ratio determining regions when the program shown in FIG. 9 is executed.

FIG. 10 shows the relationship between the output shaft rotation speed and the determining regions of the gear speeds in this example embodiment. In the drawing, only three gear speeds, i.e., N speed, (N+1) speed, and (N+2) speed, are shown. As shown in FIG. 10, the regions of adjacent gear speeds in the low rotation speed region do not overlap so it is possible to identify a neutral failure using gear ratio determining method (1). Also, as shown in FIG. 10, the upper limit value of the output shaft rotation speed to which gear ratio determining method (1) in N speed can be applied is lower than the upper limit value of the output shaft rotation speed to which gear ratio determining method (1) in (N+1) speed and (N+2) speed can be applied. Therefore, setting a reference rotation speed for each gear speed enables the rotation speed region in which determining method (2) whereby the determination is made based on the rotation speed difference can be used to be expanded. Also, in the high rotation speed region as well, the failure determination possible region can be set wider without making the gear speed determining region larger, thereby making it possible to avoid an erroneous determination.

Fourth Example Embodiment

Hereinafter, a fourth example embodiment of the invention in which a program is executed that differs from the program executed by the abnormality determining apparatus according to the first, second, and third example embodiments will be described. The hardware configuration of the vehicle (FIGS. 1, 2, and 3) is the same as it is in the first example embodiment so a detailed description thereof will not be repeated.

In this example embodiment, the reference rotation speed is set separately for the upper limit rotation speed and the lower limit rotation speed which determine the actual gear ratio (determining method (1)). That is, an abnormality of the gear speed in the automatic transmission 2000 is determined by setting a plurality of reference rotation speeds for the output shaft rotation speed NOUT for each gear speed so that the rotation speed regions using gear ratio determining method (2) whereby the determination is made based on the rotation speed difference for each gear speed do not overlap at adjacent gear speeds of the automatic transmission 2000.

The control structure of a program executed by the ECU 8000 according to this example embodiment will now be described with reference to FIG. 11.

In step S400, the ECU 8000 determines whether the output shaft rotation speed NOUT is equal to or greater than the lower limit reference rotation speed of a gear speed for which a failure determination is to be made. If the output shaft rotation speed NOUT is equal to or greater than the lower limit reference rotation speed of the gear speed for which a failure determination is to be made (i.e., YES in step S400), the process proceeds on to step S410. If not (i.e., NO in step S400), the process proceeds on to step S420.

In step S410, the ECU 8000 determines whether the output shaft rotation speed NOUT is equal to or greater than an upper limit reference rotation speed of a gear speed for which a failure determination is to be made. If the output shaft rotation speed NOUT is equal to or greater than the upper limit reference rotation speed of a gear speed for which a failure determination is to be made (i.e., YES in step S410), the process proceeds on to step S430. If not (i.e., NO in step S410), the process proceeds on to step S440.

In step S420, the ECU 8000 determines whether the output shaft rotation speed NOUT is equal to or greater than an upper limit reference rotation speed of a gear speed for which a failure determination is to be made. If the output shaft rotation speed NOUT is equal to or greater than the upper limit reference rotation speed of a gear speed for which a failure determination is to be made (i.e., YES in step S420), the process proceeds onto step S450. If not (i.e., NO in step S420), the process proceeds on to step S460.

In step S430, the ECU 8000 executes a gear ratio determining process. At this time, the determination is made by subtracting a value, which is obtained by multiplying the output shaft rotation speed NOUT by the gear ratio, from the turbine rotation speed NT (i.e., turbine rotation speed NT−output shaft rotation speed NOUT×gear ratio), just as in the gear ratio determining method (2) described above.

In step S440, the ECU 8000 executes another gear ratio determining process. At this time, the upper limit is determined by dividing the turbine rotation speed NT by the output shaft rotation speed NOUT (i.e., turbine rotation speed NT/output shaft rotation speed NOUT), just as in the gear ratio determining method (1) described above, and the lower limit is determined by subtracting a value, which is obtained by multiplying the output shaft rotation speed NOUT by the gear ratio, from the turbine rotation speed NT (i.e., turbine rotation speed NT−output shaft rotation speed NOUT×gear speed), just as in the gear ratio determining method (2) described above.

In step S450, the ECU 8000 executes a gear ratio determining process. At this time, the upper limit is determined by subtracting a value, which is obtained by multiplying the output shaft rotation speed NOUT by the gear ratio, from the turbine rotation speed NT (i.e., turbine rotation speed NT−output shaft rotation speed NOUT×gear speed), just as in the gear ratio determining method (2) described above, and the lower limit is determined by dividing the turbine rotation speed NT by the output shaft rotation speed NOUT (i.e., turbine rotation speed NT/output shaft rotation speed NOUT), just as in the gear ratio determining method (1) described above.

In step S460, the ECU 8000 executes a gear ratio determining process. At this time, the determination is made by dividing the turbine rotation speed NT by the output shaft rotation speed NOUT (i.e., turbine rotation speed NT/output shaft rotation speed NOUT), just as in the gear ratio determining method (1) described above.

Figure 12:
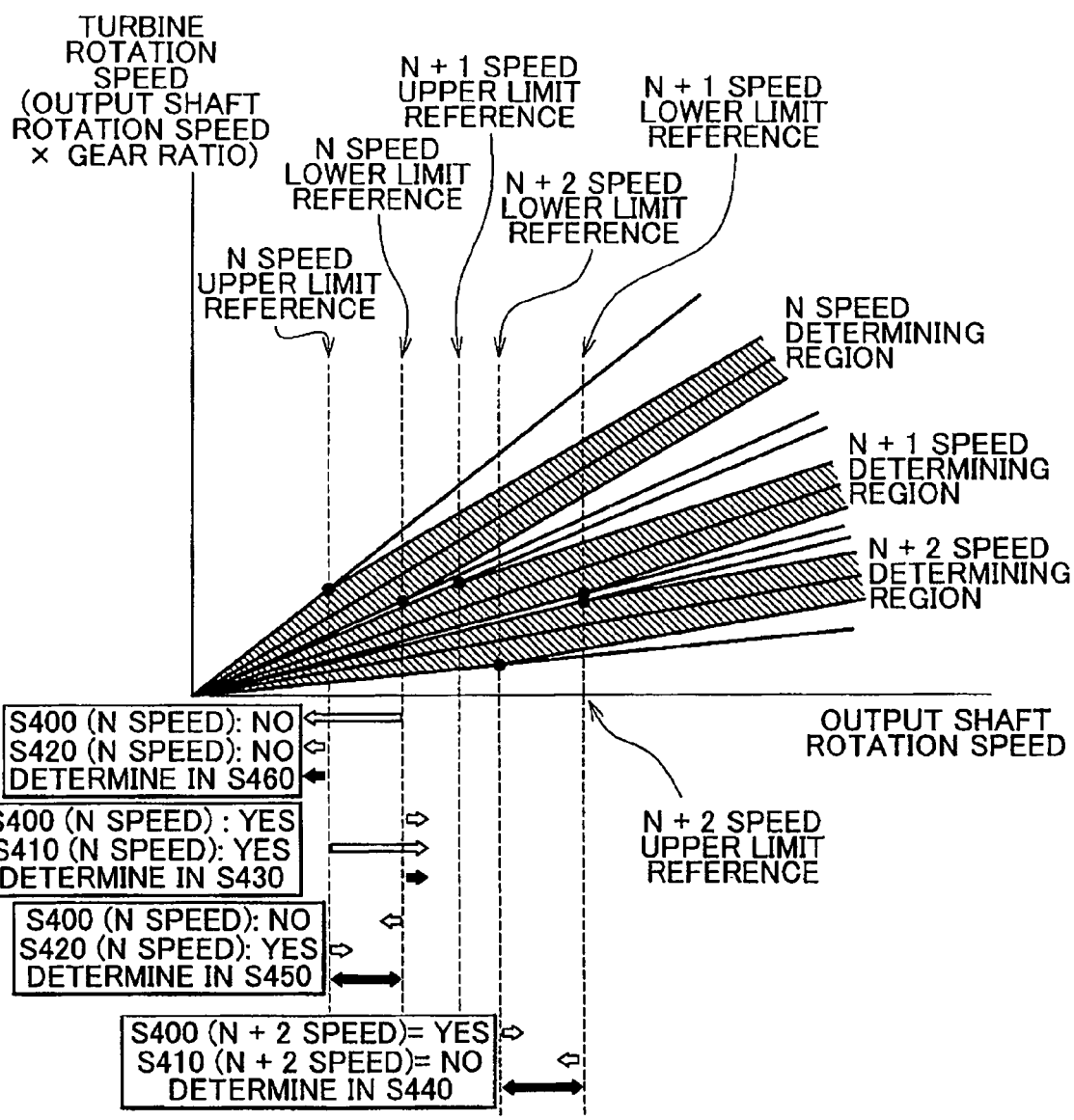
FIG. 12 is a graph showing gear ratio determining regions when the program shown in FIG. 11 is executed.

FIG. 12 shows the relationship between the output shaft rotation speed and the determining regions of the gear speeds in this example embodiment. In the drawing, only three speeds, i.e., N speed, (N+1) speed, and (N+2) speed, are shown. As shown in FIG. 12, a reference rotation speed for the output shaft rotation speed is set with the regions of adjacent gear speeds separated into a upper limit side and a lower limit side. Therefore, by setting reference rotation speeds for each gear speed as well as both the upper limit side and the lower limit side, the rotation speed region in which the determining method (2) whereby the determination is made based on the rotation speed difference can be made even wider. Also, in the high rotation speed region as well, the failure determination possible region can be set wider without making the gear speed determining region larger, thereby making it possible to avoid an erroneous determination.

More specifically, the actual gear speed can be determined to be the N speed when either condition (1) or (2) below, together with either condition (3) or (4) below are satisfied.

Figure 11:
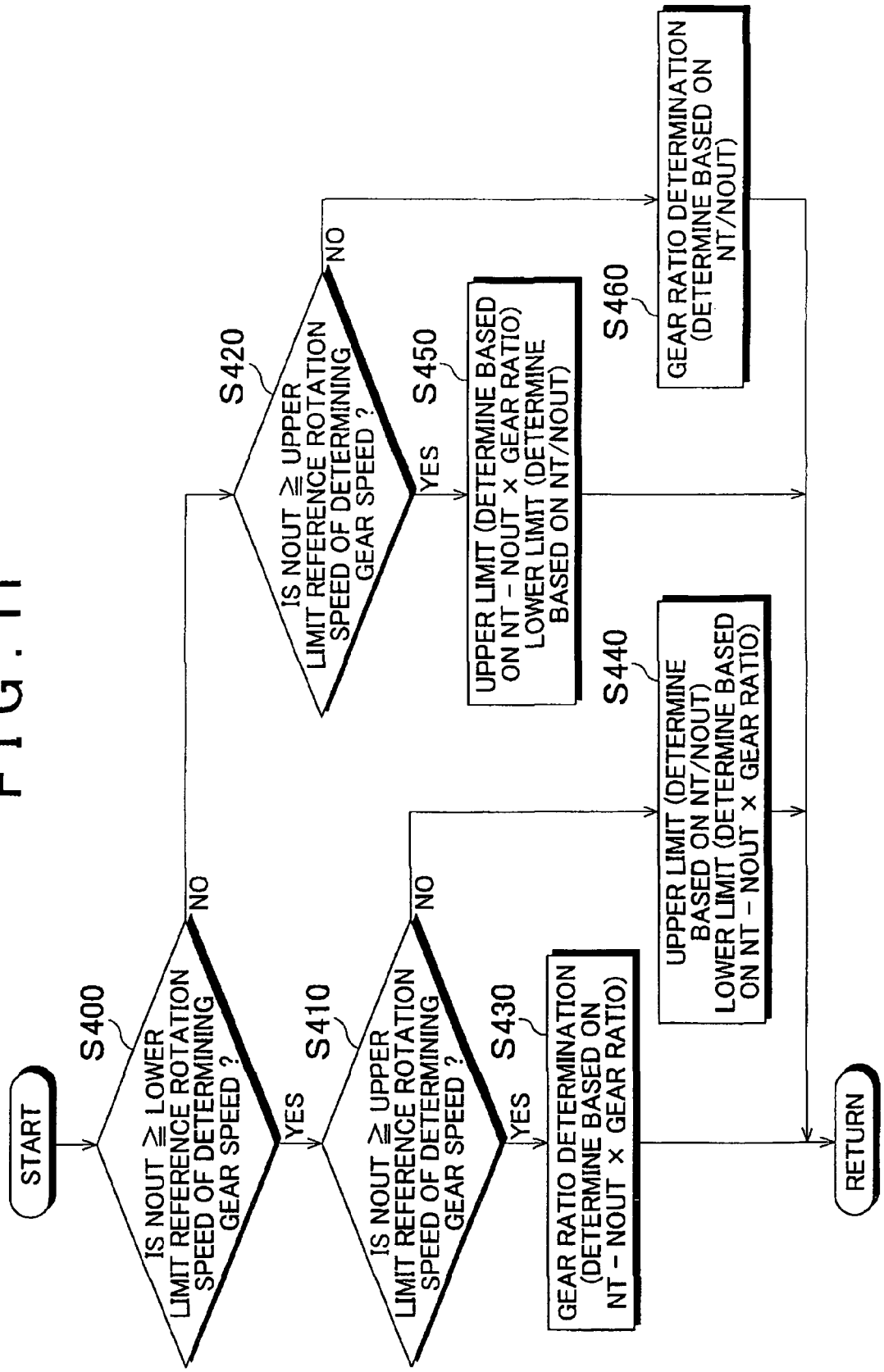
FIG. 11 is a flowchart showing the control structure of a program executed by an ECU according to a fourth example embodiment of the invention.

(1) When the output shaft rotation speed NOUT is less than the lower limit reference rotation speed of N speed, N speed gear ratio lower limit≦turbine rotation speed NT/output shaft rotation speed NOUT (2) When the output shaft rotation speed NOUT is equal to or greater than the lower limit reference rotation speed of N speed, rotation speed difference lower limit≦turbine rotation speed NT−output shaft rotation speed NOUT×N speed gear ratio (3) When the output shaft rotation speed NOUT is less than the upper limit reference rotation speed of N speed, turbine rotation speed NT/output shaft rotation speed NOUT<N speed gear ratio upper limit (4) When the output shaft rotation speed NOUT is equal to or greater than the upper limit reference rotation speed of N speed, turbine rotation speed NT−output shaft rotation speed NOUT×N speed gear ratio<rotation speed difference upper limit Moreover, FIG. 12 illustrates one example of what kinds of determining processes are performed in which region of the output shaft rotation speed NOUT and corresponds to the steps in FIG. 11.

As described above, a reference rotation speed is set on the upper limit side and lower limit side for each gear speed so the determining method (1) which uses the actual gear ratio and the determining method (2) which uses the rotation speed difference can be used as appropriate based on the upper and lower limit reference rotation speeds. As a result, the rotation speed region in which a failure is able to be determined can be made even wider.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. An abnormality determining apparatus of an automatic transmission which establishes a specified gear speed from a plurality of gear speeds having different gear ratios, comprising: an electronic control unit configured to calculate an actual gear ratio based on an input shaft rotation speed of the automatic transmission and an output shaft rotation speed of the automatic transmission, and determine that there is an abnormality in the gear ratio when the actual gear ratio is outside of a gear ratio range that is preset based on the specified gear speed;

calculate an input shaft synchronous rotation speed based on the output shaft rotation speed and the gear ratio of the specified gear speed, and determine that there is an abnormality in the gear ratio when the difference between the input shaft rotation speed and the input shaft synchronous rotation speed is outside of a preset rotation speed range;

determine whether the output shaft rotation speed is in a high rotation speed region or a low rotation speed region with respect to a reference rotation speed at which an upper limit value of the input shaft rotation speed in a rotation speed range of a higher one of the gear speeds, does not exceed a lower limit value of the input shaft rotation speed in a rotation speed range of an adjacent lower one of the gear speeds; and determine whether there is an abnormality in the gear ratio by selecting an abnormality determination when the output shaft rotation speed is in the low rotation speed region, and selecting an abnormality determination when the output shaft rotation speed is in the high rotation speed region.

2. The abnormality determining apparatus of an automatic transmission according to claim 1, wherein the electronic control unit is further an electronic control unit configured to comprising:

set the reference rotation speed according to the specified gear speed.

3. The abnormality determining apparatus of an automatic transmission according to claim 2, wherein the electronic control unit is further configured to:

set the reference rotation speed according to the specified gear speed separately as a lower limit reference rotation speed corresponding to the lower limit value of the input shaft rotation speed and an upper limit reference rotation speed corresponding to the upper limit value of the input shaft rotation speed;

determine that there is an abnormality in the gear ratio when the difference between the input shaft rotation speed and the calculated input shaft synchronous rotation speed is less than the lower limit value of the rotation speed range when the output shaft rotation speed is determined to be in the high rotation speed region with respect to the lower limit reference rotation speed, ii) determine that there is an abnormality in the gear ratio when the difference between the input shaft rotation speed and the calculated input shaft synchronous rotation speed is equal to or greater than the upper limit value of the rotation speed range when the output shaft rotation speed is determined to be in the high rotation speed region with respect to the upper limit reference rotation speed, iii) determine that there is an abnormality in the gear ratio when the calculated actual gear ratio is less than the lower limit value of the gear ratio range when the output shaft rotation speed is determined to be in the low rotation speed region with respect to the lower limit reference rotation speed, and iv) determine that there is an abnormality in the gear ratio when the calculated gear ratio is equal to or greater than the upper limit value of the gear ratio range when the output shaft rotation speed is determined to be in the low rotation speed region with respect to the upper limit reference rotation speed.

4. The abnormality determining apparatus of an automatic transmission according to claim 1, wherein the electronic control unit is further configured to determine whether the output shaft rotation speed of the specified gear speed is in the high rotation speed region or the low rotation speed region of the specified gear speed with respect to a reference rotation speed set such that, between adjacent gear speeds among all of the plurality of gear speeds, the upper limit value of the input shaft rotation speed of the automatic transmission in the rotation speed range when the specified gear speed is a high gear speed does not exceed the lower limit value of the input shaft rotation speed of the automatic transmission in the rotation speed range of a low gear speed.

5. The abnormality determining apparatus of an automatic transmission according to claim 1, wherein electronic control unit is further configured to calculate the actual gear ratio by dividing the input shaft rotation speed by the output shaft rotation speed.

6. The abnormality determining apparatus of an automatic transmission according to claim 1, wherein electronic control unit is further configured to calculate the input shaft synchronous rotation speed by multiplying the output shaft rotation speed by the gear ratio of the specified gear speed.

7. An abnormality determining apparatus of an automatic transmission which establishes a specified gear speed from a plurality of gear speeds having different gear ratios, comprising: an electronic device for calculating an actual gear ratio based on an input shaft rotation speed of the automatic transmission and an output shaft rotation speed of the automatic transmission, and determining that there is an abnormality in the gear ratio when the actual gear ratio is outside of a gear ratio range that is preset based on the specified gear speed;

calculating an input shaft synchronous rotation speed based on the output shaft rotation speed and the gear ratio of the specified gear speed, and determining that there is an abnormality in the gear ratio when the difference between the input shaft rotation speed and the input shaft synchronous rotation speed is outside of a preset rotation speed range;

for determining whether the output shaft rotation speed is in a high rotation speed region or a low rotation speed region with respect to a reference rotation speed at which an upper limit value of the input shaft rotation speed in a rotation speed range of a higher one of the gear speeds, does not exceed a lower limit value of the input shaft rotation speed in a rotation speed range of an adjacent lower one of the gear speeds; and for determining whether there is an abnormality in the gear ratio by selecting an abnormality determination when the output shaft rotation speed is in the low rotation speed region, and selecting an abnormality determination when the output shaft rotation speed is in the high rotation speed region.

8. The abnormality determining apparatus of an automatic transmission according to claim 7, wherein the electronic device sets the reference rotation speed according to the specified gear speed separately as a lower limit reference rotation speed corresponding to a lower limit value of the input shaft rotation speed and an upper limit reference rotation speed corresponding to an upper limit value of the input shaft rotation speed, an electronic device and the determining means i) determines that there is an abnormality in the gear ratio when the difference between the input shaft rotation speed and the calculated input shaft synchronous rotation speed is less than the lower limit value of the rotation speed range when the output shaft rotation speed is determined to be in the high rotation speed region with respect to the lower limit reference rotation speed, ii) determines that there is an abnormality in the gear ratio when the difference between the input shaft rotation speed and the calculated input shaft synchronous rotation speed is equal to or greater than the upper limit value of the rotation speed range when the output shaft rotation speed is determined to be in the high rotation speed region with respect to the upper limit reference rotation speed, iii) determines that there is an abnormality in the gear ratio when the calculated actual gear ratio is less than the lower limit value of the gear ratio range when the output shaft rotation speed is determined to be in the low rotation speed region with respect to the lower limit reference rotation speed, and iv) determines that there is an abnormality in the gear ratio when the calculated gear ratio is equal to or greater than the upper limit value of the gear ratio range when the output shaft rotation speed is determined to be in the low rotation speed region with respect to the upper limit reference rotation speed.

9. The abnormality determining apparatus of an automatic transmission according to claim 1, wherein the second abnormality determining device determines an actual gear ratio by subtracting the input shaft synchronous rotation speed from the input shaft rotation speed, to thereby calculate a rotation speed difference, and wherein the second abnormality determining device determines that there is an abnormality in the gear ratio when the calculated rotation speed difference is outside of a preset range.

* * * * *

UNITED STATES PATENT AND TRADEMARK OFFICE
CERTIFICATE OF CORRECTION

| | | |
|---|---|---|
| PATENT NO. | : 7,835,843 B2 | Page 1 of 1 |
| APPLICATION NO. | : 11/637670 | |
| DATED | : November 16, 2010 | |
| INVENTOR(S) | : Tatsuya Kawamura, Toshio Sugimura and Hideo Masaki | |

It is certified that error appears in the above-identified patent and that said Letters Patent is hereby corrected as shown below:

Column 14, line 29, after the phrase "gear ratios, comprising"
Delete ":"

Column 14, line 29, after the phrase "unit configured to"
Insert --:--

Column 14, line 59, after the phrase "unit is further"
Delete "an electronic control unit"

Column 14, line 60
Delete "comprising:"

Column 15, line 11, after the phrase "reference rotation speed"
Delete ", ii)" and insert --;--

Column 15, line 19, after the phrase "reference rotation speed"
Delete ", iii)" and insert --;--

Column 15, line 24, after the phrase "reference rotation speed"
Delete "," and insert --;--

Column 15, line 24, after "and"
Delete "iv)"

Column 15, line 44, after the phrase "claim 1, wherein"
Insert --the--

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,835,843 B2
APPLICATION NO. : 11/637670
DATED : November 16, 2010
INVENTOR(S) : Tatsuya Kawamura, Toshio Sugimura and Hideo Masaki It is certified that error appears in the above-identified patent and that said Letters Patent is hereby corrected as shown below:

Column 14, line 29, after the phrase "gear ratios, comprising"
Delete ":"

Column 14, line 29, after the phrase "unit configured to"
Insert --:--

Column 14, line 59, after the phrase "unit is further"
Delete "an electronic control unit"

Column 14, line 60
Delete "comprising:"

Column 15, line 11, after the phrase "reference rotation speed"
Delete ", ii)" and insert --;--

Column 15, line 19, after the phrase "reference rotation speed"
Delete ", iii)" and insert --;--

Column 15, line 24, after the phrase "reference rotation speed"
Delete "," and insert --;--

Column 15, line 24, after "and"
Delete "iv)"

Column 15, line 44, after the phrase "claim 1, wherein"
Insert --the--

This certificate supersedes the Certificate of Correction issued May 3, 2011.

Signed and Sealed this
Twelfth Day of July, 2011

David J. Kappos
*Director of the United States Patent and Trademark Office*

CERTIFICATE OF CORRECTION (continued)
U.S. Pat. No. 7,835,843 B2

Column 15, line 49, after the phrase "claim 1, wherein"
Insert --the--

Column 15, lines 55-56, after the phrase "gear ratios, comprising"
Delete ":"

Column 15, line 56, after the phrase "electronic device for"
Insert --:--

Column 16, line 6,
Delete "for"

Column 16, line 14,
Delete "for"

Column 16, line 27 after the phrase "shaft rotation speed,"
Delete "an" and insert --and the--

Column 16, lines 27 to 28 after the phrase "electronic device"
Delete "and the determining means"